(12) United States Patent
Orthlieb

(10) Patent No.: US 8,239,754 B1
(45) Date of Patent: Aug. 7, 2012

(54) SYSTEM AND METHOD FOR ANNOTATING DATA THROUGH A DOCUMENT METAPHOR

(75) Inventor: Carl W. Orthlieb, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1120 days.

(21) Appl. No.: 11/400,121

(22) Filed: Apr. 7, 2006

(51) Int. Cl.
G06F 17/24 (2006.01)
(52) U.S. Cl. ........................................................ 715/232
(58) Field of Classification Search .................... 715/232
See application file for complete search history.

(56) References Cited

U.S. PATENT DOCUMENTS

| | | | |
|---|---|---|---|
| 7,082,454 B1 * | 7/2006 | Gheith | 709/203 |
| 7,278,168 B1 * | 10/2007 | Chaudhury et al. | 726/30 |
| 7,281,018 B1 * | 10/2007 | Begun et al. | 1/1 |
| 7,418,656 B1 * | 8/2008 | Petersen | 715/230 |
| 7,432,938 B1 * | 10/2008 | Reuter et al. | 345/619 |
| 7,870,480 B1 * | 1/2011 | Oswald et al. | 715/231 |
| 2003/0065645 A1 * | 4/2003 | Itoh et al. | 707/1 |
| 2004/0139400 A1 * | 7/2004 | Allam et al. | 715/526 |
| 2004/0162833 A1 * | 8/2004 | Jones et al. | 707/100 |
| 2005/0125716 A1 * | 6/2005 | Cragun et al. | 715/512 |
| 2005/0144096 A1 * | 6/2005 | Caramanna et al. | 705/30 |
| 2005/0183002 A1 * | 8/2005 | Chapus | 715/505 |
| 2005/0198202 A1 * | 9/2005 | Yamamoto | 709/218 |
| 2005/0223315 A1 * | 10/2005 | Shimizu et al. | 715/512 |
| 2005/0234958 A1 * | 10/2005 | Sipusic et al. | 707/102 |
| 2006/0005117 A1 * | 1/2006 | Yamashita et al. | 715/512 |
| 2006/0015811 A1 * | 1/2006 | Tanaka et al. | 715/531 |
| 2006/0031256 A1 * | 2/2006 | Bosworth et al. | 707/104.1 |
| 2007/0055926 A1 * | 3/2007 | Christiansen et al. | 715/512 |
| 2007/0067707 A1 * | 3/2007 | Travis et al. | 715/500.1 |
| 2007/0118794 A1 * | 5/2007 | Hollander et al. | 715/512 |
| 2007/0130114 A1 * | 6/2007 | Li et al. | 707/2 |
| 2007/0143029 A1 * | 6/2007 | Nelson et al. | 702/19 |
| 2007/0174761 A1 * | 7/2007 | Lin et al. | 715/512 |
| 2007/0214407 A1 * | 9/2007 | Bargeron et al. | 715/512 |
| 2008/0065979 A1 * | 3/2008 | Fujimaki | 715/230 |
| 2008/0208790 A1 * | 8/2008 | Oshima et al. | 707/1 |
| 2008/0250311 A1 * | 10/2008 | Mitsufuji | 715/273 |
| 2008/0262833 A1 * | 10/2008 | Kano et al. | 704/10 |
| 2009/0204882 A1 * | 8/2009 | Hollander et al. | 715/230 |

OTHER PUBLICATIONS

Nagao et al., "Semantic Annotation and Transcoding: Making Web Content More Accessible", pp. 69-81, Apr.-Jun. 2001.*
Fisler, Joel, et al., "Development of sustainable e-learning content with the open source eLesson Markup Language eLML", Jun. 2-3, 2005.*
Carr et al., The Case for Explicit Knowledge in Documents, ACM, Proceedings of DocEng '04, Oct. 28-30, 2004, p. 90-98.*

* cited by examiner

Primary Examiner — Laurie Ries
Assistant Examiner — Frank D Mills
(74) Attorney, Agent, or Firm — Schwegman, Lundberg & Woessner, P.A.

(57) ABSTRACT

A method for annotating an electronic document includes associating a first electronic annotation to a data point of a data structure associated with an electronic document.

12 Claims, 11 Drawing Sheets

210 — SCHEDULES A&B
(FORM 1040)
DEPARTMENT OF THE TREASURY
INTERNAL REVENUE SERVICE (99)

212 — SCHEDULE A—ITEMIZED DEDUCTIONS
(SCHEDULE B IS ON BACK)

▷ ATTACH TO FORM 1040.   ▷ SEE INSTRUCTIONS FOR SCHEDULES A&B (FORM1040).

OMB NO. 1545-0074
2005
ATTACHMENT SEQUENCE NO. 07

NAME(S) SHOWN ON FORM 1040                                     YOUR SOCIAL SECURITY NUMBER
... ...

214 — MEDICAL AND DENTAL EXPENSES

CAUTION. DO NOT INCLUDE EXPENSES REIMBURSED OR PAID BY OTHERS
1 MEDICAL AND DENTAL EXPENSES ( SEE PAGE A-2) ...        1  | $4,320.53 |
2 ENTER AMOUNT FROM FORM 1040. LINE 38             | 2 |
3 MULTIPLY LINE 2 BY 7.5% (.075) ...                     3
4 SUBSTRACT LINE 3 FROM LINE 1. IF LINE 3 IS MORE THAN LINE 1, ENTER -0- ...   4

TAXES YOU PAID
(SEE PAGE A-2.)

5 STATE AND LOCAL (CHECK ONLY ONE BOX):
   A ☐ INCOME TAXES, OR
   B ☐ GENERAL SALES TAXES (SEE PAGE A-5) ...        5
6 REAL ESTATE TAXES (SEE PAGE A-3) ...               6
7 PERSONAL PROPERTY TAXES ...                        7
8 OTHER TAXES. LIST TYPE AND AMOUNT ▷                8
  ........................................
9 ADD LINES 5 THROUGH 8 ...                                       9

INTEREST YOU PAID
(SEE PAGE A-5.)

10 HOME MORTGAGE INTEREST AND POINTS REPORTED TO YOU ON FORM 1098     10
11 HOME MORTGAGE INTEREST NOT REPORTED TO YOU ON FORM 1098. IF
   PAID TO THE PERSON FROM WHOM YOU BROUGHT THE HOME, SEE PAGE A-6
   AND SHOW THAT PERSON'S NAME, IDENTIFYING NO., AND ADDRESS▷

INPUT FIELD — 216

TYPE = FIELD
CAPTION = 'MEDICAL AND DENTAL EXPENSES (SEE PAGE A-2):
LOCATION = 325, 1050
SIZE = 150, 50
TYPE = NUMERIC
DATALINK = "/EXPENSES/MEDANDDENTTOTAL"

SCHEDULES A&B
(FORM 1040)
DEPARTMENT OF THE TREASURY
INTERNAL REVENUE SERVICE (99)

212 — SCHEDULE A—ITEMIZED DEDUCTIONS
(SCHEDULE B IS ON BACK)
▷ ATTACH TO FORM 1040.   ▷ SEE INSTRUCTIONS FOR SCHEDULES A&B (FORM 1040).

OMB NO. 1545-0074
2005
ATTACHMENT SEQUENCE NO. 07

NAME(S) SHOWN ON FORM 1040 | YOUR SOCIAL SECURITY NUMBER

MEDICAL AND DENTAL EXPENSES
CAUTION. DO NOT INCLUDE EXPENSES REIMBURSED OR PAID BY OTHERS
1 MEDICAL AND DENTAL EXPENSES (SEE PAGE A-2) ... 
2 ENTER AMOUNT FROM FORM 1040. LINE 38
3 MULTIPLY LINE 2 BY 7.5% (.075)
4 SUBTRACT LINE 3 FROM LINE 1. IF L... — 314  $4,320.53

QUESTIONABLE ITEM
IRS AUDITOR # 353
PLEASE ELABORATE ON THE ITEM AND PROVIDE SUPPORTING DATA
1/27/2006 4:23:41 PM
OPTIONS — 310

TAXES YOU PAID (SEE PAGE A-2.)
5 STATE AND LOCAL (CHECK ONLY ONE B
   A ☐ INCOME TAXES, OR
   B ☒ ENERAL SALES TAXES (SEE P
6 REAL ESTATE TAXES (SEE PAGE A-5)
7 PERSONAL PROPERTY TAXES
8 OTHER TAXES. LIST TYPE AND AMOUNT ▷
9 ADD LINES 5 THROUGH 8

INTEREST YOU PAID (SEE PAGE A-5.)
10 HOME MORTGAGE INTEREST AND POINTS REPORTED TO YOU ON FORM 1098
11 HOME MORTGAGE INTEREST NOT REPORTED TO YOU ON FORM 1098. IF PAID TO THE PERSON FROM WHOM YOU BROUGHT THE HOME, SEE PAGE A-6 AND SHOW THAT PERSON'S NAME, IDENTIFYING NO, AND ADDRESS ▷

304 — DATA REQUEST
TYPE = STICKYNOTE
LOCATION = 350, 1000
CONTENTS = "PLEASE ELABORATE ON THIS ITEM AND PROVIDE SUPPORTING DATA"
LOCATIONLINK = "/FORM/SCHEDULEA/MEDICAL DENTAL/EXPENSES/LINE1"

INPUT FIELD — 216
TYPE = FIELD
CAPTION = "MEDICAL AND DENTAL EXPENSES (SEE PAGE A-2):
LOCATION = 325, 1050
SIZE = 150, 50
TYPE = NUMERIC
DATALINK = "/EXPENSES/MEDANDDENTTOTAL"

FIG. 4B

SCHEDULES A&B (FORM 1040)
DEPARTMENT OF THE TREASURY
INTERNAL REVENUE SERVICE (99)

SCHEDULE A—ITEMIZED DEDUCTIONS
(SCHEDULE B IS ON BACK)
▷ ATTACH TO FORM 1040.    ▷ SEE INSTRUCTIONS FOR SCHEDULES A&B (FORM 1040).

OMB NO. 1545-0074
2005
ATTACHMENT
SEQUENCE NO. 07

NAME(S) SHOWN ON FORM 1040 ............................................................. YOUR SOCIAL SECURITY NUMBER ...

MEDICAL AND DENTAL EXPENSES
CAUTION. DO NOT INCLUDE EXPENSES REIMBURSED OR PAID BY OTHERS
1 MEDICAL AND DENTAL EXPENSES ( SEE PAGE A-2) ...
2 ENTER AMOUNT FROM FORM 1040, LINE 38
3 MULTIPLY LINE 2 BY 7.5% (.075)
4 SUBTRACT LINE 3 FROM LINE 1. IF L...

TAX PAYER
ATTACHMENT CONTAINS SCANNED ITEMS
AND SPREADSHEET SUPPORTING THIS TOTAL
— 406

— 402

QUESTIONABLE ITEM
IRS AUDITOR # 353
PLEASE ELABORATE ON THE ITEM AND PROVIDE SUPPORTING DATA
1/27/2006 4:23:41 PM ☒
◁ OPTIONS 314
404

RESPONSE TO REQUEST
TYPE = FILE ATTACHMENT
LOCATION = 360,1002
CONTENTS = "ATTACHMENT
CONTAINS SCANNED ITEMS
AND SPREADSHEET
SUPPORTING THIS TOTAL"
DATA=<...BINARY DATA
ATTACHMENT...>
LINK=<REF TO DATA
REQUEST 304>

TAXES YOU PAID
(SEE PAGE A-2.)
5 STATE AND LOCAL (CHECK ONLY ONE B
   A ☐ INCOME TAXES, OR
   B ☐ GENERAL SALES TAXES (SEE
6 REAL ESTATE TAXES (SEE PAGE A-5)
7 PERSONAL PROPERTY TAXES
8 OTHER TAXES. LIST TYPE AND AMOUNT ▷
9 ADD LINES 5 THROUGH 8

INTEREST YOU PAID
(SEE PAGE A-5.)
10 HOME MORTGAGE INTEREST AND POINTS REPORTED TO YOU ON FORM 1098
11 HOME MORTGAGE INTEREST NOT REPORTED TO YOU ON FORM 1098. IF
   PAID TO THE PERSON FROM WHOM YOU BOUGHT THE HOME, SEE PAGE A-6
   AND SHOW THAT PERSON'S NAME, IDENTIFYING NO., AND ADDRESS

INPUT FIELD — 216
TYPE = FIELD
CAPTION = 'MEDICAL AND DENTAL EXPENSES (SEE PAGE A-2):
LOCATION = 325, 1050
SIZE = 150, 50
TYPE = NUMERIC
DATALINK = "/EXPENSES/MEDANDDENTTOTAL"

DATA REQUEST — 304
TYPE = STICKYNOTE
LOCATION = 350,1000
CONTENTS = "PLEASE ELABORATE ON THIS ITEM
AND PROVIDE SUPPORTING DATA"
LOCATIONLINK = "/FORM/SCHEDULEA/MEDICAL
DENTAL/EXPENSES/LINE1"

SYSTEM AND METHOD FOR ANNOTATING DATA THROUGH A DOCUMENT METAPHOR

FIELD

This application relates to a method and system for data management, and specifically, for annotating data through a document metaphor.

BACKGROUND

Electronic documents are often submitted in the course of business to various entities, including individuals, corporations, and government agencies. Often the subject matter of these electronic documents is derived from multiple data sources. For example, an entities' tax return includes numerical fields or data points derived from such data as total income and total expenses. If more data for a particular number (e.g., total expenses) is requested, often via an attached note, the entity in response would either send an electronic copy or a hard copy of the data referencing the request and the field (e.g., total expenses). More often than not, the attached items are lost or the data does not adequately reference the field, which results in costly delays and confusion.

Although some applications allow for electronically attaching data within the electronic document, such as a note or file, the data is only associated with a specific location within the document, such as the x and y coordinates of a particular page. As a result, when additional pages are added or the document is dimensionally altered, the attached data may be repositioned to a different location than was originally intended, and no longer references the correct field or data point that the data was intended to annotate.

SUMMARY

According to an aspect, there is provided a method for annotating an electronic document. In one embodiment, the electronic document including a data structure associated with the electronic document. The user system may then associate at least one electronic annotation to a data point of the data structure associated with the electronic document.

Other features will be apparent from the accompanying drawings and from the detailed description that follows.

BRIEF DESCRIPTION OF DRAWINGS

Embodiments are illustrated by way of example and not limitation in the figures of the accompanying drawings, in which like references indicate similar elements and in which:

FIG. 2B illustrates, according to one embodiment, a visual representation of the relationship between what is displayed to a user of a document system sees and an input field of an electronic document;

FIG. 3B illustrates, according to one embodiment, a visual representation of the relationship between what is displayed to a user of a document system sees, an input field, and a data request.

FIG. 4B illustrates, according to one embodiment, a visual representation of the relationship between what is displayed to a user of a document system sees, an input field, a data request, and a response to request;

DETAILED DESCRIPTION

In the following description, for purposes of explanation, numerous specific details are set forth in order to provide a thorough understanding of an example embodiment. It will be evident, however, to one skilled in the art that the present invention may be practiced without these specific details.

Figure 1:
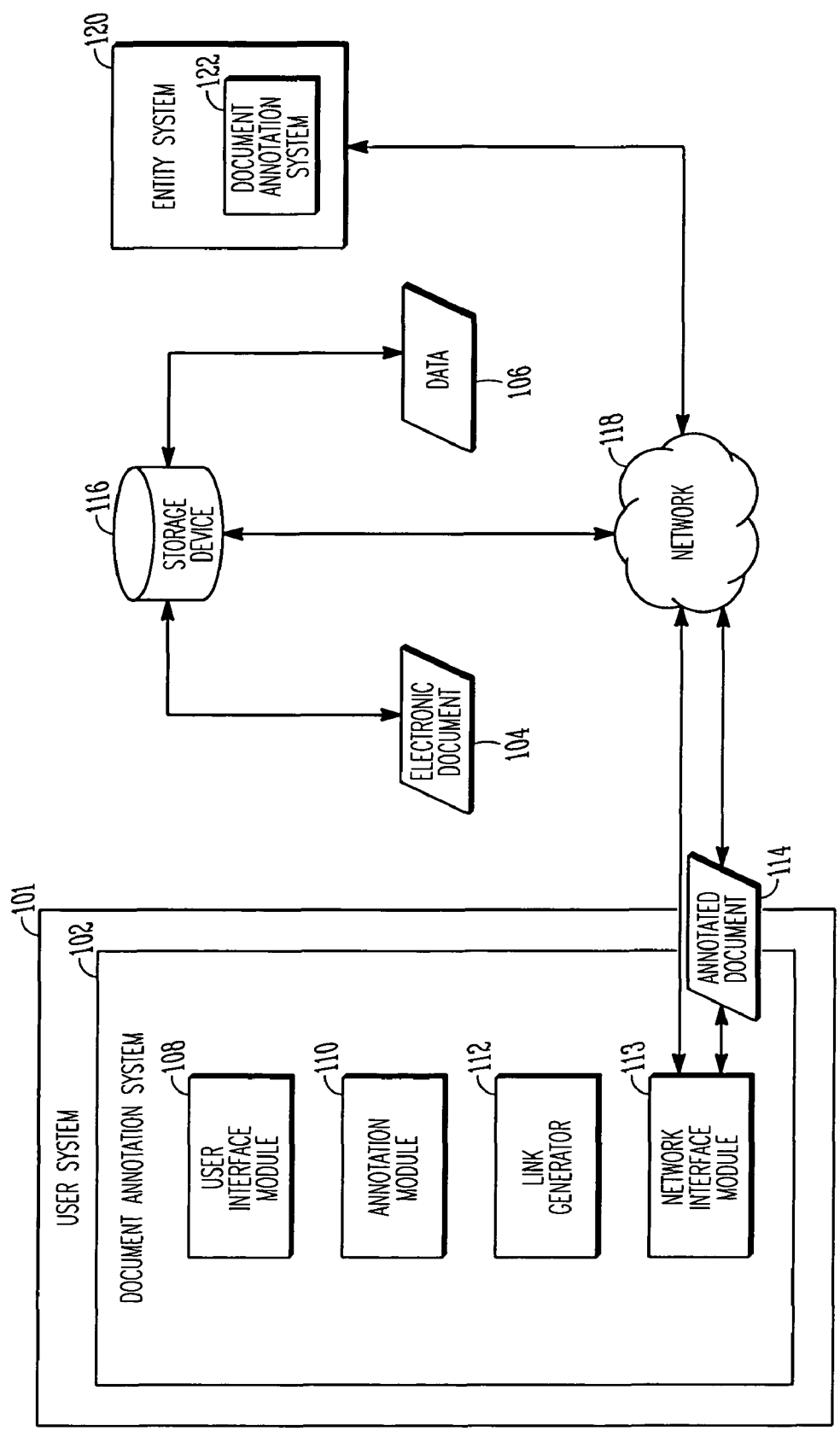
FIG. 1 is a block diagram of an example embodiment of a user system including a document annotation system configured to annotate data points within an electronic document.

FIG. 1 is a block diagram of an example embodiment of a user system 101 including a document annotation system 102 configured to annotate data points (e.g., a data point 224 of FIG. 2A) within a source electronic document 104 with data 106 to create an annotated document 114. In various embodiments, the data point 224 may be an input field for text (e.g., alpha-numeric characters) or may be a variety of other display/interaction structures, such as a chart, a table, and a graphic, for example.

The document annotation system 102 includes a user interface module 108, an annotation module 110, a link generator 112, and a network interface module 113. For simplicity, references to the annotated electronic document 114 will correspond to the electronic document after the annotation process is complete. During the annotation process, all operations associated with the process may be associated with the electronic document 104. However, the annotated electronic document 114 may still be operated upon by the annotation process when further annotation is required by the document annotation system 102 or a document annotation system 122 of an entity system 120 (discussed in detail below).

The user interface module 108 uses a display device for displaying the electronic document 104 and the annotated electronic document 114. Additionally, the user interface module 108 may utilize various devices (e.g., mouse, keyboard, etc.) to create the annotated electronic document 114 from the electronic document 104. For example, a mouse may be used to select an input field (e.g., see input filed 216 of FIG. 2B) such that the user may input data (e.g., input annotation data) into the electronic document 104 to be associated with at least one data point (e.g., associated with the input field or the input field itself). In one embodiment, the user interface module 108 displays a request for additional data, the additional data being for example, a link or attached data associated with one or more data points of the electronic document 104.

The document annotation system 102 may also access a storage device 116 over a network 118. The storage device 116 may store electronic documents and their associated data, such as the electronic document 104 and data 106. In various embodiments, the storage device 116 is a data repository or data warehouse capable of being securely accessed and optionally queried by the document annotation system 102 and/or an entity system 120. Although illustrated as accessible over network 118 via the network interface 113, in other example embodiments the storage device 116 may be a storage device local to either the user system 101 or the entity system 120, and that the network 118 may include a local network and a gateway to a wide area network (e.g., the Internet).

In one embodiment, the entity system 120 may be operated by an entity such as an individual, a corporation, or a government agency. The entity may require the user of the document annotation system 102 to submit an electronic document in compliance with one or more rules, regulations or laws. Additionally, the entity may require, before or after the initial submission of the electronic document, supporting data for one or more data points within the electronic document. This requirement may be complied with by the user utilizing the document annotation system 102 described herein.

The annotation module 110, according to an example embodiment, may be used in conjunction with the user interface module 108 to associate relevant data with a data point (e.g., data point 224) within a data structure (e.g., document template/layout) of the electronic document. The relevant data may be retrieved from the storage device 116 and, in various embodiments, appended to, attached to, or associated with the electronic document by various methods known in the art, such as an electronic file attachment, embedded data or data file, or a hyperlink. In one embodiment, the data point may correspond to one or more elements within the data structure.

For a large amount of response (supporting) data (e.g., data 106>5 Mb), the link generator 112 may be used to create a hyperlink (e.g., see response to request 402 of FIG. 4B) within the annotated electronic document 114 to a secure data source, such as storage device 116, accessible by the entity system 120 via the network 118. The data 106 may be stored, encrypted, and securely accessed by the document annotation system 102 using any of the various methods commonly known in the art.

In one embodiment, the hyperlink is a reference in a hypertext document (e.g., in a web page) or other document capable of displaying and processing hypertext. The hyperlink may be a location reference (e.g., a URL) to another document or other resource containing the data 106. When combined with the network 118 and a suitable access protocol (e.g., Hypertext Transfer Protocol (HTTP)/Internet Protocol (IP)), the hyperlink may be used to securely fetch the resource referenced response data (e.g., the data 106). In various embodiments, the data 106 after retrieval may be saved, viewed, or displayed as part of the annotated electronic document 114.

In another embodiment, the link generator 112 may be used to create a hyperlink within the annotated electronic document 114 to another location within the annotated electronic document 114, such as an appendix that includes the data 106. The data 106 within the annotated electronic document 114 may be stored therein in a variety of forms known in the art. For example, the data 106 may be at least one of encrypted, compressed, or part of executable code within the annotated electronic document 114. When selected, the link may cause the existing application, or call another application, to display the data 106, or cause code associated with data 106 to execute and display the relevant data.

The entity system 120, in an example embodiment, includes a document annotation system 122 similar to that described with reference to the document annotation system 102 described herein. The document annotation system 122 may be configured to provide the entity of the entity system 120 with an interface to annotate data points of the electronic document 104 or the annotated electronic document 114 (e.g., a second request for data submission) with requests (e.g., data) for additional data pertaining to one or more data points.

In one embodiment, the document annotation system 122 generates a network address or location identifier (e.g., a link in the form of a Uniform Resource Locator (URL)), as described above with respect to the document annotation system 102, that when selected by the user system 101 allows the user to access a secured location, such as a secure web site, and to input the requested data associated with the relevant data point. The input data may then be communicated over the network 118 to a storage device (local or remote to the entity system 120), such as the storage device 116 accessible by the entity system 120. Once stored, the entity system 120 may then process and view the data. For example, the entity system 120 may retrieve the data from the storage device 116, and based on the associated data point and at least one of a user identifier and electronic document identifier, insert the data or create a link or reference to the data at the corresponding data point within the electronic document previously received from the user system 101.

Figure 2A:
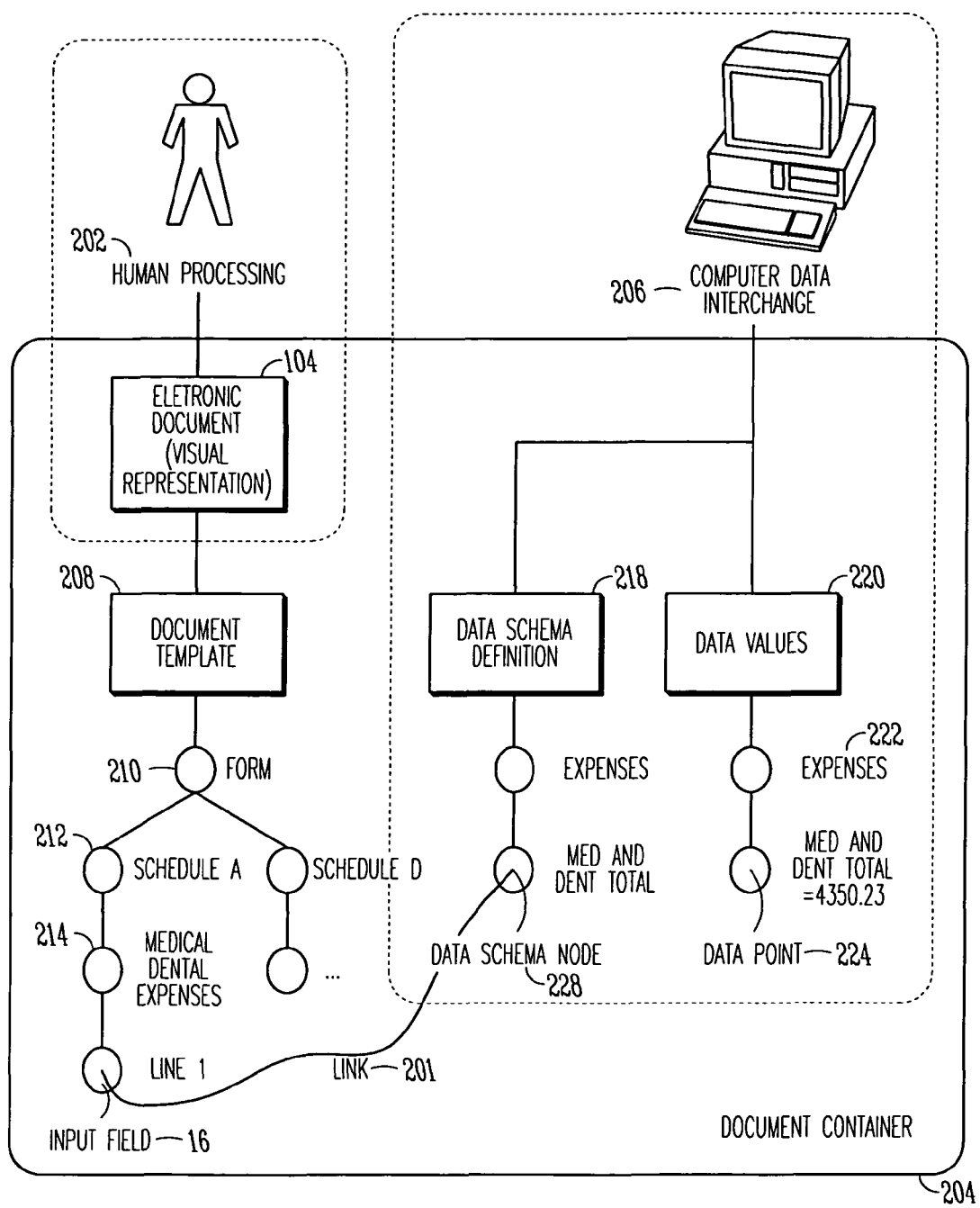
FIG. 2A illustrates an example embodiment of a relationship between a user of a document system, a document container representing an electronic document, and a computer data interchange.

FIG. 2A illustrates an example of a relationship between a user 202 (e.g., of user system 101 or of entity system 120), a document container 204 representing the electronic document 104, and a computer data interchange 206. The document container 204 includes, at a high level, the electronic document 104 (and the annotated electronic document 114 after annotation, see FIG. 3A), a document template 208, a data schema definition 218, and data values 220.

In one embodiment, the document template 208 is composed of at least one form, such as form 210 (e.g., Form 1040). The form 210 may include a hierarchy of subforms further composed of predefined and user defined fields. For example, form 210 includes subform 212 (e.g., Schedule A), a predefined field 214 (e.g., Medical and Dental Expenses), and an input field 216 (e.g., Line 1). As illustrated in this example, the predefined field 214 is utilized to provide a context to the user for the one or more user fields (e.g., input field 216), in this example the context is the category of medical and dental expenses. It can be appreciated by those skilled in the art that the predefined field 214 may include a multitude of user input fields like that of the input field 216. For example, as illustrated in FIG. 2B, the predefined field 214 may include user input fields for lines 1 (e.g., input field 216), 2, 3, and 4, all of which would fall under the category of medical and dental expenses of subform 212 (e.g., Schedule A) within form 210 (e.g., Form 1040). Along those same lines, the form 210 may include a multitude of subforms, such as subform 212, and those subforms may also include subforms and so on.

The input field 216 may be defined as any known type, alpha-numeric, numeric, integer, etc., and may include other attributes, such as a caption (e.g., defining or instructional text), a location, a width, and a height.

The computer data interchange 206 illustrates a path from an input device that shows the relationship between a data value entered into an input field (e.g., input field 216), represented in part by the data values 220, and the data schema definitions associated with the document template, as shown by the data schema definition 218. In continuing with the current example, data schema definition 218 may include a hierarchy of data schema nodes such as "expenses" and below that a data schema node 228, "MedAndDenTotal." Similarly, the data values 220 may include a hierarchy of data points such as data point 222, "expenses," and below that data point 224, "MedAndDenTotal," which may represent the user 202's medical and dental expense data entry into the input field 216. In one embodiment, the data point 222 may be implemented as a descriptive parent element (e.g., expenses) for one or more specific input data points (e.g., data point 224). In another embodiment, the data point 222 may be a total value of all its children (e.g., data point 224, etc.) within the hierarchy as summed and entered by a user or automatically determined by computer operation.

Further illustrating the relationship between these elements is a link 201 between the input field 216 and the data schema node 228, which expresses a binding between the document template 208 and the underlying data, such as the data inputted into the input field 216 and represented in data point 224. For example, in the above diagram, the link might take the form of an XPath string, "/expenses/MedAndDentTotal."

FIG. 2B illustrates, according to one embodiment, a visual representation of the relationship between what the user 202 sees and the input field 216. In this example, the user 202 has entered a numerical value into input field 216 (e.g., Line 1) corresponding to, "$4,320.53" of the predefined field 214 (e.g., medical and dental expenses) in the subform 212 (e.g., Schedule A) under the form 210 (e.g., Form 1040). As discussed above, this value is linked via link 201 to the data point 204. In one embodiment, a mouse click in the visual region defined by the input field 216 (Line 1) might activate the field for input by the user 202. In other embodiments, the input field 216 may be activated for input by other mechanisms and methods known in the art, such as voice activation, touch screen, keyboard, etc.

Dollar sign may be pre-programmed into input field 216 or the user 202 may be allowed to enter one or more predetermined allowable characters. It can be appreciated that a variety of rules may be applied to a particular input field based on which programmatic language is selected in creating the document template 208.

The document template 208 may be created with one of a multitude of programmatic languages that allow for the linking of input fields, external data, data schema definitions and data points within a document. For example, in one embodiment, the programmatic language may be of a markup language that allows for a document structure composed of tags, such as a metadata tag, in which one or more tags may be associated with a particular data point, such as data point 224. Therefore, data entered into the data point 224 may be associated with a tag descriptor of the document template 208.

In one embodiment, the metadata tags are XBRL (extensible business reporting language) tags. XBRL is an XML-based (eXtensible Markup Language) standard to define and exchange business and financial performance information among various entities. XBRL is a "standards" based way to communicate business and financial performance data. These communications are defined by metadata set out in taxonomies that may be used to create document templates (e.g., document template 208). Taxonomies capture the definition of individual data points (e.g., data point 224) as well as the relationships between data points within a taxonomy and in other taxonomies.

Figure 3A:
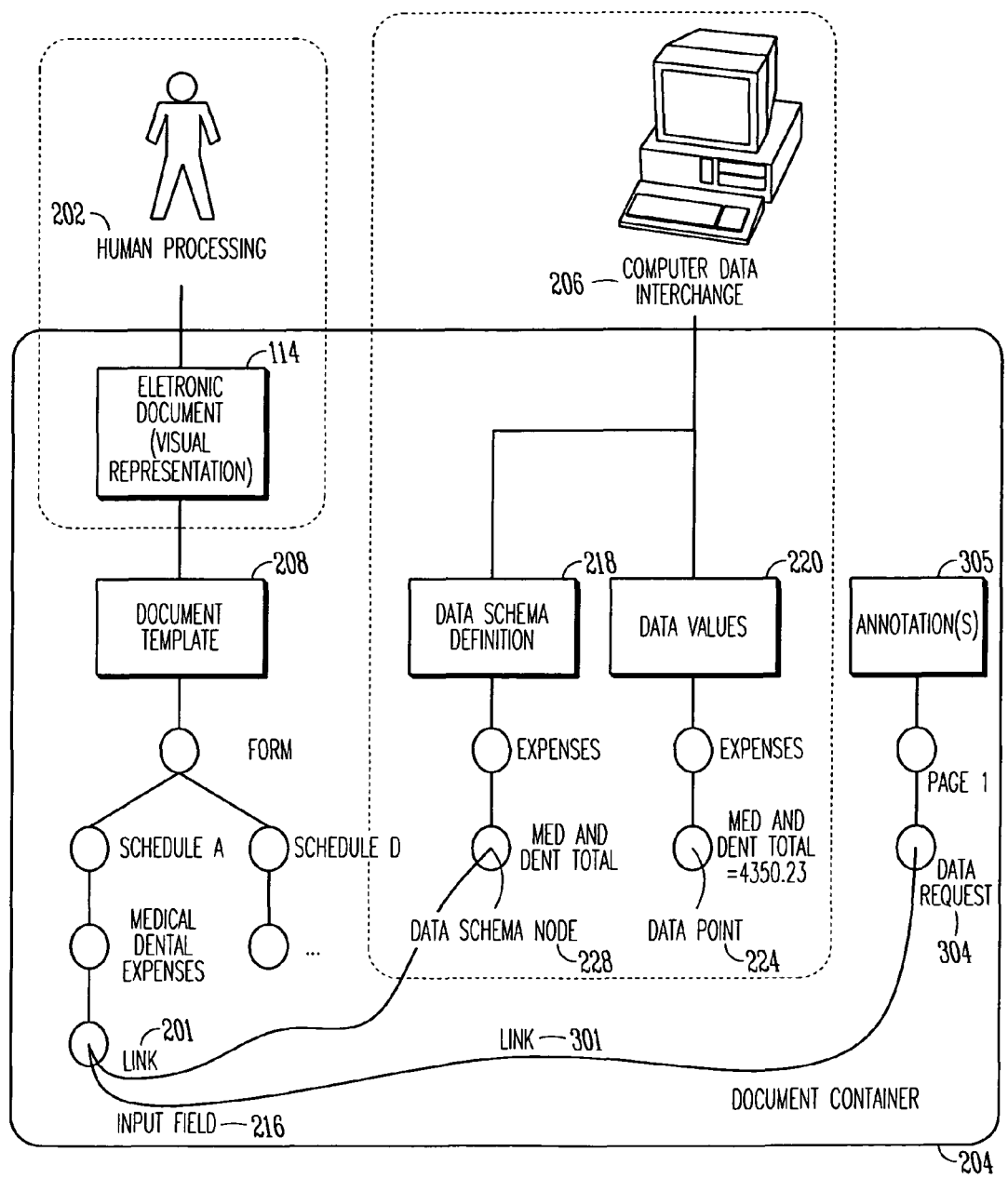
FIG. 3A illustrates, according to an example embodiment, the state of an annotated electronic document after a data request is placed on an electronic document.

The electronic document 104 may be annotated by the entity system 120 via the document annotation system 122 to create the annotated electronic document 114. FIG. 3A illustrates, according to an example embodiment, the state of the annotated electronic document 114 after a data request 304 from annotations 305 is placed on the electronic document 104.

In one embodiment, the document annotation system 122, via its components similar to the annotation module 110 and link generator 112, may intersect the x-y location (coordinates on a particular page) of that annotation with the field definitions on the page and form a link 301 between the data request 304 and input field 216. For example, as illustrated in FIG. 3A, the link 301 might take the form of a string that may indicate a path describing the location pertaining to the annotation, such as an XPath string: "/Form/Schedule A/Medical Dental Expenses/Line 1."

There may be a three-step link between the data request 304 and the data point 224. The first link is the link 301 between the data request 304 and the input field 216 and the second link is the link 201 between the input field 216 and the data schema node 228. A mapping between the data values 218 to the data schema definition 218 may be implied as illustrated by the connector between the data values 218, which includes data point 224, and the data schema definition 218, which includes data schema node 228.

In various example embodiments, the data request 304 may include such data as alpha-numeric characters, images, one or more links, attachments, etc. The data request 304 may be associated with the data point 224 in a multitude of example embodiments. The data request 304 may further be associated with a metadata tag (not shown) within the document template 208 of the annotated electronic document 114. The metadata tag of the data request 304 may include a relational association with a second metadata tag of the data point 224.

In one embodiment, the data request 304 may be displayed as an overlay upon annotated electronic document 114. In another embodiment, the data request 304 may be a link (or reference) to another portion of the annotated electronic document 114, such as an appendix, and may still maintain a relational association with data point 224. In yet another embodiment, the data request 304 may be a link (or reference) to a storage location (e.g., the storage device 116) that includes a file or portion of computer implemented code for displaying the text or other communication to the user of user system 101 pertaining to the request for additional data associated with the data point 224.

FIG. 3B illustrates, according to one embodiment, a visual representation of the relationship between what is displayed to the user 202, the input field 216, and the data request 304. Associating the data request 304 with the input field 216 causes the link 301 to be generated between the data request 304 and the input field 216. As discussed above with reference to FIG. 2B, there may be various actions that associate the data request 304 with the input field 216 (e.g., a mouse click within the input field 216 and text entry via keyboard).

In various embodiments, similar to the input field 216, the data request 304 may be defined as any known type, such as alpha-numeric, numeric, integer, etc., and may include other attributes, such as a caption (e.g., descriptive window bar, etc.), a location (e.g., display location), a width, and a height. In this example, the data request 304 is of the type "StickyNote." The type may define certain characteristics of the input, as here, where "StickyNote" is an overlay type input as illustrated by a text window 310 of the data request 304 sitting atop the main display of the subform 212 (Schedule A). The text window 310 may include functional controls, such as an "options" control 312 and descriptive elements that may be automatically filled into the window based on such information as a login or manually entered data (e.g., "IRS Auditor" number, date and time, etc.). The options control 312 may include an additional set of functions to facilitate the creation of the data request 304. For example, an option may be a user selectable action, such as, "respond to this request."

In one embodiment, the creation of the data request 304 may include the creation of an icon 314 representing the data request 304. The data request 304 may be then be activated (e.g., overlay the text window 310) by an interaction (e.g., mouse click, touch screen input, etc.) with the icon 314. It can be appreciated there are a multitude of methods known in the art in which a supplemental attachment, association or link may visually associated (e.g., icon 314) with a document field, such as the association of the data request 304 to the input field 216.

Figure 4A:
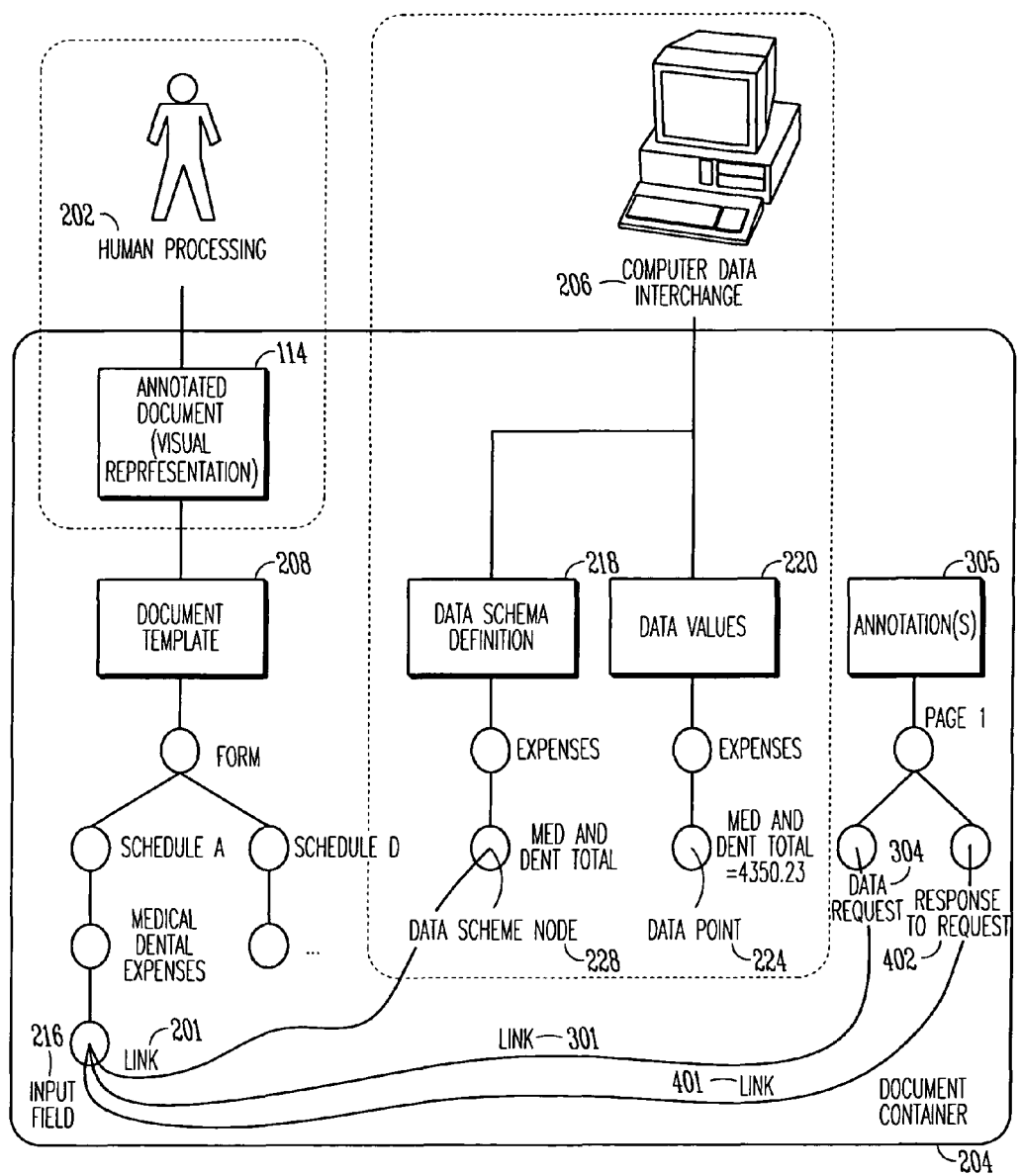
FIG. 4A illustrates, according to an example embodiment, the state of an annotated electronic document after a response to request is placed on an electronic document.

In response to the data request 304, the electronic document 104 may be annotated by the user system 101 via the document annotation system 102 to create a response to request 402. FIG. 4A illustrates, according to an example embodiment, the state of the annotated electronic document 114 after the response to request 402 is placed on the electronic document 104. Similar to the placement of the data request 304, the response to request 402 may be placed under annotations 305 within the document container 204. In one embodiment, the document annotation system 102 via the annotation module 110 and the link generator 112 may intersect the x-y location (coordinates on a particular page) of that annotation with all of the field definitions on the page and form a link 401 between the response to request 402 and the input field 216. The link 401 may take the form of a string that may indicate a path describing the location pertaining to the annotation, such as an XPath string, "/Form/Schedule A/Medical Dental Expenses/Line 1."

FIG. 4A further illustrates completion of the underlying association between various components with the document container 204. The data schema definition 218 (including the data schema node 228), the data values 220 (including data point 202), the data request 304, and the response to request 402 have links such that request for data and the associated supporting data (e.g., data 106 in the response to request 402) have a relationship to the data point 202. Therefore, an embodiment utilizing this type of "linked" relationship in an electronic document (e.g., annotated electronic document 114) does not have to rely on the x-y coordinate placement of the data request 304 or the response to request 402 on the electronic document 104, which may ensure the correct annotated data is associated with the correct data point 224.

FIG. 4B illustrates, according to one embodiment, a visual representation of the relationship between what is displayed to the user 202, the input field 216, the data request 304, and the response to request 402. In various embodiments, similar to the data request 304, the response to request 402 may be defined as any known type, such as alpha-numeric, numeric, integer, etc., and may include other attributes, such as a caption (e.g., "Contents" displayed in a pop-up overlay 406, etc.), a location (e.g., display location), a width, and a height. In this example, the response to request 402 is the type "File Attachment." The type may define certain characteristics of the input, as here, where "File Attachment" is a link represented by an icon 404 (illustrated as a paperclip) that the user 202 may activate to access (e.g., download) the response to request 402. It should be noted the data associated with the response to request 402 is not shown in FIG. 4B but is represented by the icon 404.

In one embodiment, the creation of the response to request 402 may include the creation of the icon 404 representing the response to request 402. The response to request 402 may then be activated (e.g., to start download of attached document(s) by an interaction, such as a mouse click, touch screen input, etc.) with the icon 404. As mentioned above, in one embodiment, the pop-up overlay 406 (e.g., activated by a mouse "hover") may include text or other descriptive data indicating type and content of the response to request 402 as may be defined by a "Contents" field in the response to request 402.

The response to request 402 may be associated with a metadata tag (not shown) that may include a relational association with at least one of the metadata tag of the data point 224 and the data request 304. In one embodiment, the response to request 402 may be displayed as an overlay upon the annotated electronic document 114. In another embodiment, the response to request 402 may be a link to another portion of the annotated electronic document 114, such as an appendix, and may still maintain a relational association with at least the data point 224 and the data request 304. In yet another embodiment, the response to request 402 may be a link to a storage location (e.g., the storage device 116) that includes a file or portion of computer implemented code for displaying the text or other communication associated with the response to request 402 to the entity of the entity system 120. In the various embodiments described above, the response data (e.g., response to request 402) associated with the data point 224 may be displayed to the user 202 in response to a selection operation performed by the user 202 with respect to the annotated electronic document 114. The selection operation may be any known in the art, such as a mouse click to an area of the screen (e.g., the response to request 402) or a selection from a menu associated with the display application.

In one example embodiment, the user may create a response similar to response to request 402 without having first received a request, such as request 304. For example, a user may include supporting data for a data point other than data point 224 in anticipation of a request from the entity. The composition of the response may be that of any of the embodiments for response to request 402 described above.

Figure 5:
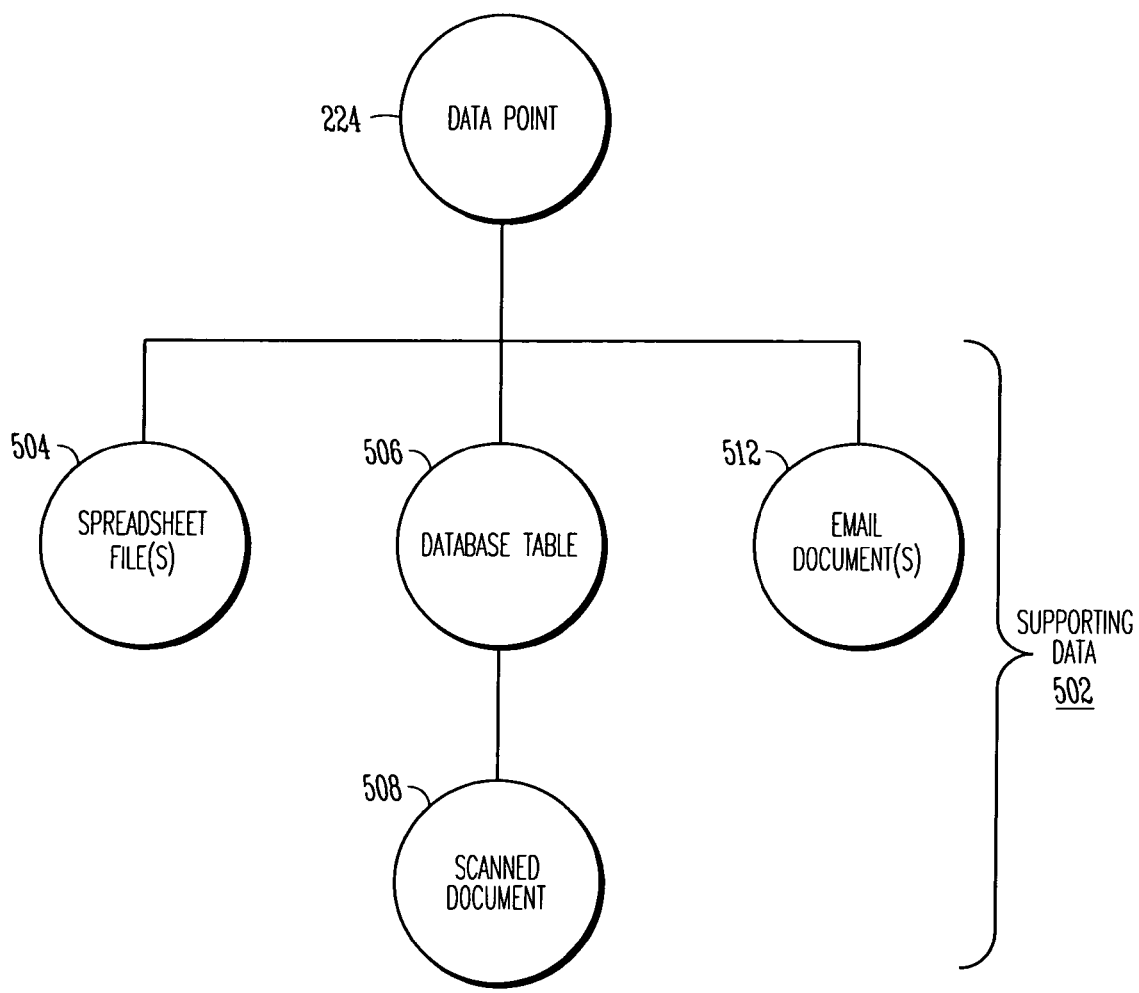
FIG. 5 is a block diagram illustrating examples of supporting data, according to various embodiments, that may be referenced or supplied in a response to a request for additional data.

FIG. 5 is a block diagram illustrating examples of supporting data 502 that may be referenced (e.g., by an active link) or supplied in the response to request 502, as response data or input data, in response to the request for additional data associated with the input field 216, data schema node 228 and the data point 224, as discussed above. The examples include, but are not limited to, spreadsheet files 504, a database table 506 (or link thereto), and email documents 510. The database table 506 references, by methods and structures commonly known in the art, one or more stored documents, such as scanned document 508. It can be appreciated that the database table 506 may also include references to other types of documents, such as spreadsheet files, text files, images, and email documents.

Figure 6A:
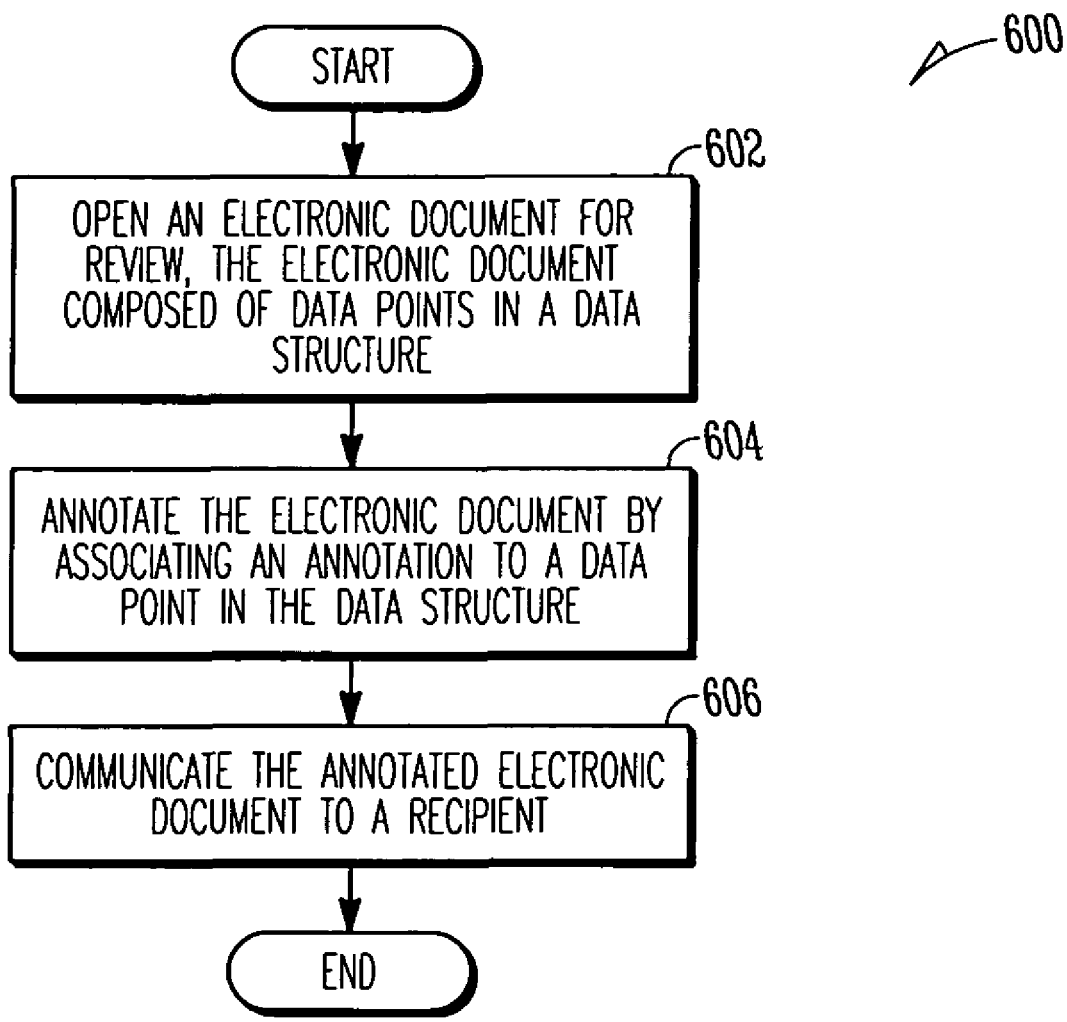
FIG. 6A is a flow chart illustrating an annotation of an electronic document according to an example embodiment.

FIG. 6A is a flow chart 600 illustrating an example embodiment of annotating an electronic document. At operation 602, a first user may open and electronic document for review. In one embodiment, the electronic document is composed of data points in a data structure. For example, the first user may want to review a particular section of the document, which includes a data point previously edited (e.g., filled in a numerical value in a character field) by a second user. After review, the first user annotates the electronic document, at operation 604, by associating an annotation to the data point in the data structure. In one embodiment, after all annotations of data points under review are complete, at operation 606, the user communicates the annotated electronic document back to the second user. In various embodiments, thereafter the second user may respond to the annotation with additional annotations associated with the annotated data points created by the first user or create new annotations to be associated with other data points within the electronic document, as described herein.

Figure 6B:
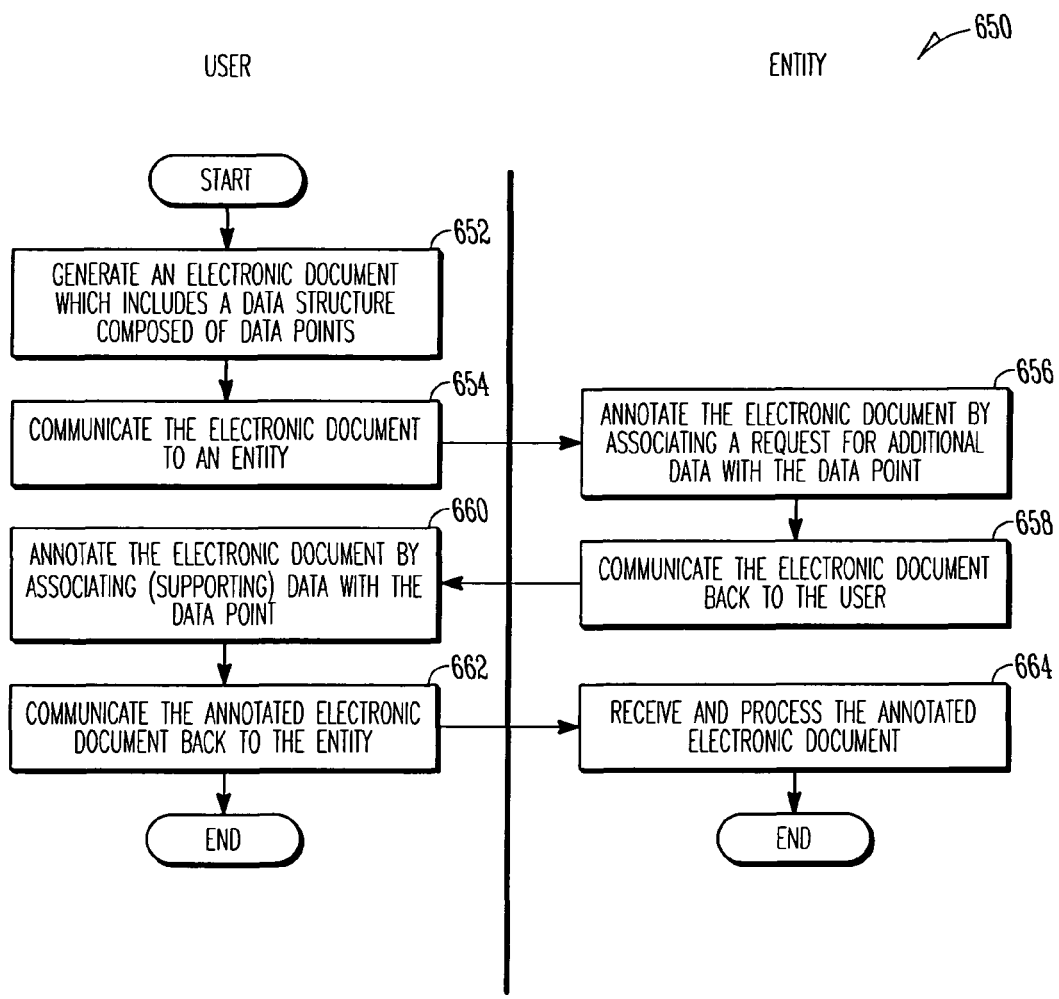
FIG. 6B is a flow chart illustrating operational interactions for annotating an electronic document between a user system and an entity system.

FIG. 6B is a flow chart 650 illustrating an example embodiment of operational interactions for annotating an electronic document between a user system and an entity system (e.g., the user system 101 and the entity system 120). The user of user system 101, at operation 652, generates an electronic document which includes a document template (data structure) composed of input fields data points (e.g., the electronic document 104, the document template 208, the input field 216, and the data point 224). It should be noted, although in the examples herein the input field 216 is associated with the data point 224, the data point 224 or other data points, may be associated with various types of display/interaction structures, such as a chart, table, graphic, etc.

At operation 654, the user communicates the electronic document to an entity at the entity system. The entity at operation 656 annotates the electronic document by entering input data composed of a request (e.g., the data request 304) for additional data pertaining to the data point and associating the request with the input field, data schema node, and the data point (e.g., see FIGS. 2, 3 and 4). At operation 658, the entity communicates the electronic document back to the user at the user system. The user, in response to the request, at operation 660, annotates the electronic document by entering input data composed of response data (e.g., the response to request 402, the supporting data 502) and associating the response data with the input field and the data point. At operation 662, the user communicates the annotated electronic document (e.g., annotated electronic document 114) back to the entity at the entity system. At operation 664, the entity system receives and processes the annotated electronic document. As discussed above, processing the annotated document may include processing a link in the response to a location within the annotated document or a location of a storage device (e.g., storage device 116) that includes the supporting data associated with the data point.

Figure 7:
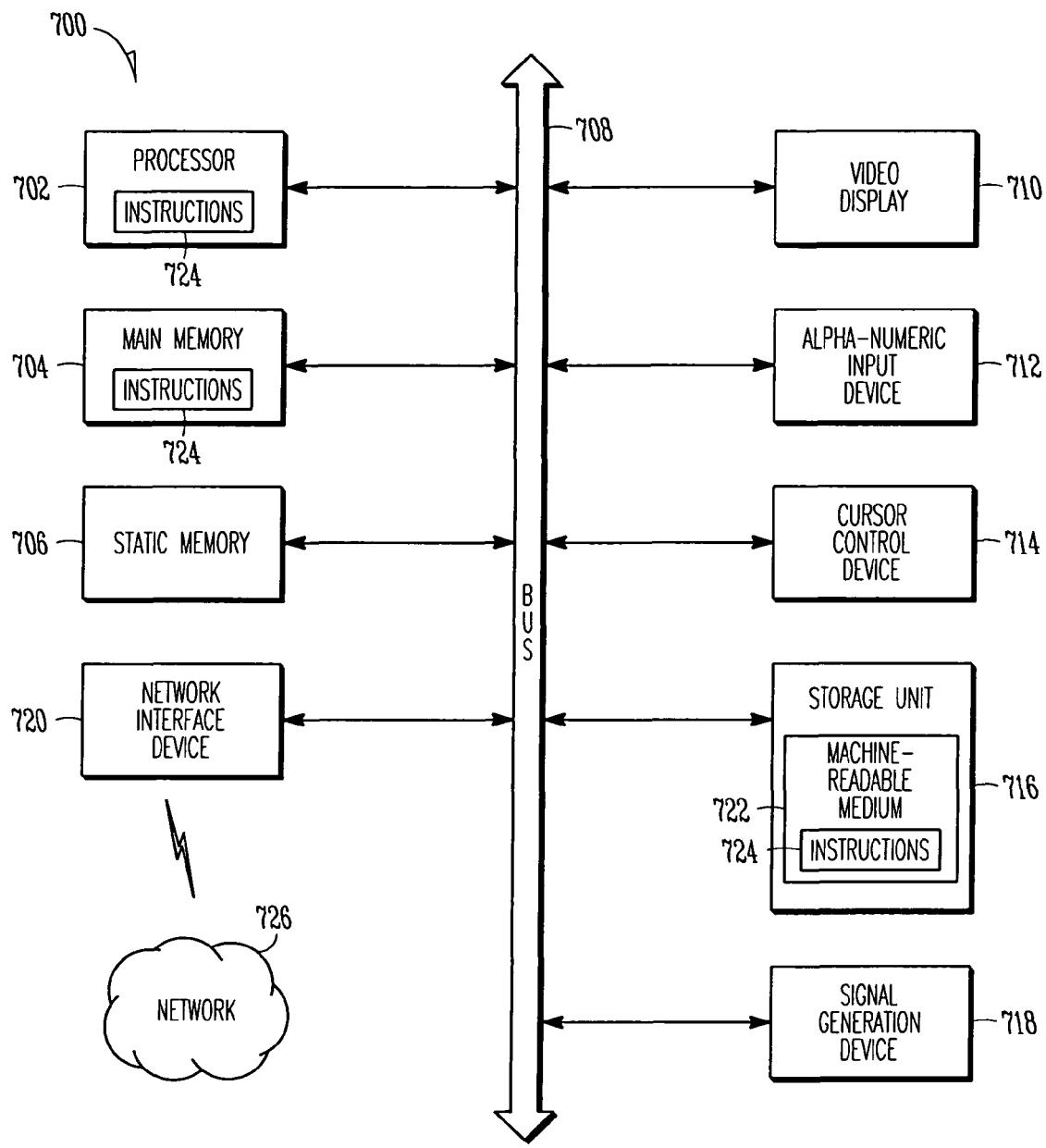
FIG. 7 shows a diagrammatic representation of machine in the example form of a computer system within which a set of instructions, for causing the machine to perform any one or more of the methodologies discussed herein, may be executed.

FIG. 7 shows a diagrammatic representation of machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any tangible medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, and optical and magnetic media.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method, comprising:
associating a first electronic annotation to a data point of a document template associated with an electronic document, the document template being a layout of the electronic document, and the electronic document being generated based on the document template, the first electronic annotation being a request for data associated with the data point, the request for data being further associated with a metadata tag, and wherein the associating includes generating a selectable link within the electronic document from the data point to the first electronic annotation; and
associating a second electronic annotation to at least the first electronic annotation and the data point, the second electronic annotation being a response to the request for data, the response to the request for data being associated with an additional metadata tag, the additional metadata tag including at least one relational association with the metadata tag associated with the request for data.

2. The method of claim 1, wherein the selectable link to the first electronic annotation is a link to a network storage location storing the first electronic annotation.

3. The method of claim 1, wherein the selectable link to the first electronic annotation is a link to another portion of the annotated electronic document storing the first electronic annotation.

4. The method of claim 1, wherein the selectable link to the first electronic annotation is a link to at least one of an electronic file attachment and data embedded within the annotated electronic document.

5. A non-transitory machine-readable medium embodying instructions that, when executed by a machine, cause the machine to perform operations, comprising:

associating a first electronic annotation to a data point of a document template associated with an electronic document, the document template being a layout of the electronic document, and the electronic document being generated based on the document template, the first electronic annotation being a request for data associated with the data point, the request for data being further associated with a metadata tag, and wherein the operation of associating includes generating a selectable link within the electronic document from the data point to the first electronic annotation; and associating a second electronic annotation to at least the first electronic annotation and the data point, the second electronic annotation being a response to the request for data, the response to the request for data being associated with an additional metadata tag, the additional metadata tag including at least one relational association with the metadata tag associated with the request for data.

6. The non-transitory machine-readable medium of claim 5, the operations further comprising detecting a selection of the selectable link, wherein the selectable link is associated with at least one of the data point, an input data, and an icon displayed on the electronic document.

7. The non-transitory machine-readable medium of claim 5, wherein the selectable link associated with the first electronic annotation is a link to a network storage device containing the first electronic annotation.

8. The non-transitory machine-readable medium of claim 5, wherein the document template is a markup language structure and the data point is comprised of one or more metadata tag.

9. The non-transitory machine-readable medium of claim 8, wherein the one or more metadata tags are one or more XBRL (extensible business reporting language) tag.

10. The non-transitory machine-readable medium of claim 5, wherein the data point is at least one of an input field, a chart, a table, a text field, and a graphic.

11. A system, comprising:

at least one processor; and a memory in communication with the at least one processor, the memory being configured to store a user interface module, an annotation module, and a link generator that are executable by the at least one processor, the user interface module to display an electronic document including a data point of a document template associated with the electronic document, the document template being a layout of the electronic document, and the electronic document being generated based on the document template;

the annotation module to:

associate first input annotation data with the data point of the document template; create an annotated electronic document, the first input annotation data being a request for data associated with the data point, the request for data being further associated with a metadata tag; and associate second input annotation data with at least one of the first input annotation data and the data point, the second input annotation data being a response to the request for data, the response to the request for data being associated with an additional metadata tag, the additional metadata tag including at least one relational association with the metadata tag associated with the request for data; and the link generator to generate a link within the annotated electronic document to at least the first input annotation data and the second input annotation data, and the user interface to display the link.

12. The system of claim 11, wherein the link includes at least one of the first input annotation data, the second input annotation data, a selectable link to the first input annotation data, and a selectable link to the second input annotation data.

* * * * *